United States Patent [19]

Belfoure

[11] Patent Number: 4,778,853
[45] Date of Patent: Oct. 18, 1988

[54] POLYCARBONATE RESIN MIXTURES

[75] Inventor: Edward L. Belfoure, New Harmony, Ind.

[73] Assignee: General Electric Company, Mt. Vernon, Ind.

[21] Appl. No.: 538,127

[22] Filed: Oct. 3, 1983

[51] Int. Cl.⁴ .............................................. C08L 67/02
[52] U.S. Cl. ...................................................... 525/67
[58] Field of Search .......................................... 525/67

[56] References Cited

U.S. PATENT DOCUMENTS

| | | | |
|---|---|---|---|
| 3,580,965 | 5/1971 | Brinkmann | 525/176 |
| 4,226,950 | 10/1980 | Holub | 525/67 |
| 4,257,937 | 3/1981 | Cohen | 525/148 |
| 4,260,693 | 4/1981 | Liu | 525/148 |
| 4,264,487 | 4/1981 | Fromuth | 525/67 |
| 4,267,096 | 5/1981 | Bussink | 525/67 |
| 4,320,212 | 3/1982 | Liu | 525/148 |
| 4,352,907 | 10/1982 | Lee | 524/537 |
| 4,440,905 | 4/1984 | Dunkelberger | 525/67 |
| 4,469,850 | 9/1984 | Belfoure et al. | 525/439 |

Primary Examiner—Patricia Short
Attorney, Agent, or Firm—Martin B. Barancik

[57] ABSTRACT

Novel compositions with high room temperature impact strength, high impact strength in thick-walled sections, and good weld line strength are provided in the form of resinous mixtures comprising:

(a) an aromatic carbonate polymer resin selected from the group consisting of
  (i) an aromatic polycarbonate resin,
  (ii) a poly(ester-carbonate) copolymer resin, and
  (iii) a mixture of (i) and (ii);
(b) a polyester resin selected from the group consisting of
  (i) a poly(alkylene terephthalate) resin,
  (ii) an amorphous copolyester copolymer resin, and
  (iii) a mixture of (i) and (ii); and
(c) a minor amount of an impact modifier combination therefor comprising:
  (i) a multiphase composite interpolymer; and
  (ii) a copolymer of an olefin with an acrylate or methacrylate comonomer.

6 Claims, No Drawings

POLYCARBONATE RESIN MIXTURES

BACKGROUND OF THE INVENTION

The present invention relates to thermoplastic compositions having improved impact strength. More particularly, it relates to polycarbonate resin mixtures having improved impact strength at room temperatures.

Aromatic carbonate polymers are well known, commercially available materials having a wide variety of applications in the plastics art. Such carbonate polymers may be prepared by reacting a dihydric phenol, such as 2,2-bis(4-hydroxyphenyl) propane, with a carbonate precursor, such as phosgene, in the presence of an acid binding agent. Generally speaking, aromatic polycarbonate resins offer a high resistance to the attack of mineral acids, may be easily molded, are physiologically harmless as well as strain resistant. It is also well known that polycarbonate resins have high impact strength below a critical thickness of between about ⅛ and ¼ inch. Above this average thickness the impact strength of polycarbonate resins diminishes and is accompanied by a change in failure mode from ductile to brittle. Moreover, the impact strength of polycarbonate resins decreases rapidly as the temperature decreases below about −5° C. and also after aging the polymers at elevated temperatures above about 100° C. These characteristics consequently limit the fields of application for unmodified aromatic polycarbonate resins.

Accordingly, in an effort to improve the impact resistant behavior of polycarbonate resins, it has been proposed to add modifiers to the polycarbonate. In Goldblum, U.S. Pat. No. 3,431,224, assigned to the same assignee as the present invention, for example, it is proposed to add modifiers, in certain proportions, the modifiers comprising at least one member of the class consisting of polyethylene, polypropylene, polyisobutylene, a copolymer of ethylene and an ethyl acrylate, a copolymer of ethylene and propylene, a cellulose ester, a polyamide, a polyvinyl acetal, an alkyl cellulose ester, and a polyurethane elastomer. Although the results with such modifiers are generally excellent in thin sections, e.g., in parts of ⅛ inch thickness, there is a tendency for failure to occur with these modifiers in thicker molded parts of ¼ inch or more, and such failure is of the undesirable brittle type.

Nakamura, et al., discloses in U.S. Pat. No. 3,864,428 compositions comprising blends of aromatic polyester, aromatic polycarbonate and butadiene based graft copolymers, wherein the polycarbonate comprises from 10 to 75 weight percent of the overall blend, which are said to possess good room temperature impact strength.

Fromuth, et al., in U.S. Pat. No. 4,180,494, discloses high impact strength compositions comprising about 25 to 95 percent by weight aromatic polyester, about 1 to 8 percent by weight of an aromatic polycarbonate and the balance to make 100% of a core shell copolymer having a butadiene based core.

Farnham, et al., in U.S. Pat. No. 4,086,202 discloses that the impact resistance of poly(alkylene terephthalate) resins is improved by the incorporation of a multiphase composite interpolymer having an elastomeric first stage and a thermoplastic final stage.

SUMMARY OF THE INVENTION

It has now been discovered that an aromatic polycarbonate resin, or an aromatic poly(estercarbonate) copolymer resin or a mixture of such resins may be provided with enhanced room temperature impact strength in molded sections by incorporating therewith, in certain proportions, a polyester resin selected from poly (alkylene terephthalate) resins or an amorphous copolyester copolymer resin, or a mixture of two or more of said resins, and an impact modifier combination therefore comprising a multiphase composite interpolymer having a rubbery acrylate core and hard thermoplastic shell and a copolymer of an olefin with an acrylate or methacrylate comonomer.

It has now been found that when the above-mentioned modifiers are added to a polycarbonate resin or a poly(estercarbonate) copolymer resin, within certain ranges, the resultant mixtures possess improved room temperature impact strength and good weld line strength when compared to unmodified polycarbonate resins.

DETAILED DESCRIPTION OF THE INVENTION

In accordance with the present invention it has been found that the foregoing desirable properties are obtained with resin mixtures comprising an intimate blend of:
  (a) an aromatic carbonate polymer resin selected from the group consisting of
    (i) an aromatic polycarbonate resin,
    (ii) an aromatic poly(estercarbonate) resin, and
    (iii) mixtures of (i) and (ii),
  (b) a polyester resin selected from the group consisting of
    (i) a poly(alkylene terephthalate) resin,
    (ii) an amorphous copolyester copolymer resin, and
    (iii) mixtures of (i) and (ii); and
  (c) a minor amount of an impact modifier combination
  therefore comprising
    (i) a multiphase composite interpolymer comprising a first elastomer core stage of a $C_1$–$C_6$ alkyl acrylate together with a crosslinking monomer and a graftlinking monomer and a hard final stage comprising, completely or predominantly, a $C_1$–$C_6$ methacrylate; and
    (ii) a copolymer of an olefin and at least one monomeric compound selected from a $C_1$–$C_6$ alkyl acrylate, a $C_1$–$C_6$ alkyl methacrylate, acrylic acid, methacrylic acid, or a mixture of any of the foregoing monomers.

All of the various possible combinations of the above-identified components may be utilized to produce impact resistant compositions within the scope of the present invention. The many intended embodiments of the invention will be identified and described more particularly hereinafter.

The amounts of the modifiers to be employed may vary broadly but, in general, best results will be obtained when a major portion of (a)+(b) is (a), (a) being generally from about 55–85 weight % of (a)+(b). (a) is preferably from 55–100 weight % (a)(ii). The weight % of (b) is generally about 15–45 weight % (b). The impact modifier (c) is generally about 3–10 weight % of (a)+(b). Generally from about 50–80 weight % of (c) is (c)(i).

The addition of the modifiers may be accomplished in any manner so long as a thorough distribution of the modifiers in the aromatic carbonate polymer resin (a) is obtained. Generally, the polyester resin component (b) is blended with the aromatic carbonate polymer resin (a) first and thereafter the modifier combination is added, but this is not critical.

The mixing of these materials may be accomplished by a variety of methods normally employed for incorporation of plasticizers or fillers into thermoplastic polymers, including but not limited to, mixing rolls, dough mixers, Banbury mixers, extruders, and other mixing equipment. The resulting mixtures may be handled in any conventional manner employed for the fabrication or manipulation of thermoplastic resins. The materials may be formed or molded using compression, injection, calendering, extrusion and blow molding techniques, alone or in any combination. Also multi-processing methods, such as extrusion blow molding or co-extrusion-co-injection can be used, e.g, for multi-layer containers.

It should be understood that the resin mixtures prepared in accordance with the invention may also contain, in addition to the above-mentioned polymers, other additives to lubricate, reinforce, prevent oxidation, or lend color to the material. Other additives, such as mold release agents and stabilizers are well known in the art, and may be incorporated without departing from the scope of the invention.

The fact that the addition of the combination of components specified above to a polycarbonate resin system provides a resinous mixture having an improved resistance to impact failure at room temperatures and over a broad range of molded section thicknesses is totally unexpected and not fully understood.

The compositions of the subject invention comprise (a) an aromatic carbonate polymer resin selected from
(i) an aromatic polycarbonate resin,
(ii) an aromatic poly(ester-carbonate) copolymer resin, and
(iii) mixtures of (i) and (ii).

The aromatic polycarbonate resins for use herein as component (a)(i) may be prepared by reacting a dihydric phenol with a carbonate precursor, such as phosgene, a haloformate or a carbonate ester. Generally speaking, such carbonate polymers may be typified as possessing recurring structural units of the formula:

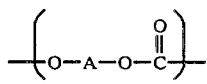

wherein A is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.00 dl./g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are:
2,2-bis-(4-hydroxyphenyl)propane;
hydroquinone;
resorcinol;
2,2-bis-(4-hydroxyphenyl)pentane;
2,4'-(dihydroxydiphenyl)methane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxydiphenyl;
2,4'-dihydroxynaphthalene;
bis-(4-hydroxydiphenyl)sulfone;
bis-(3,5-diethyl-4-hydroxyphenyl)sulfone;
2,2-bis-(3,5-dimethyl-4-hydroxyphenyl)propane;
2,4'-dihydroxydiphenyl sulfone;
5'-chloro-2,4'-dihydroxydiphenyl sulfone;
bis-(4-hydroxyphenyl)diphenyl sulfone;
4,4'-dihydroxydiphenyl ether;
4,4'-dihydroxy-3,3'-dichlorodiphenyl ether;
4,4'-dihydroxy-2,5-dihydroxydiphenyl ether; and the like.

Other dihydric phenols which are also suitable for use in the preparation of the above polycarbonates are disclosed in U.S. Pat. Nos.2,999,835, 3,038,365, 3,334,154 and 4,131,575.

These aromatic polycarbonates can be manufactured by known processes, such as, for example and as mentioned above, by reacting a dihydric phenol with a carbonate precursor, such as phosgene, in accordance with methods set forth in the above-cited literature and U.S. Pat. Nos.4,018,750 and 4,123,436, or by transesterification processes such as are disclosed in U.S. Pat. No. 3,153,008, as well as other processes known to those skilled in the art.

It is possible to employ two or more different dihydric phenols or a copolymer of a dihydric phenol with a glycol or with a hydroxy- or acid-terminated polyester or with a dibasic acid in the event a carbonate copolymer or interpolymer rather than a homopolymer is desired for use in the preparation of the polycarbonate mixtures of the invention. Branched polycarbonates are also useful, such as are described in U.S. Pat. No. 4,001,184. Also there can be utilized blends of a linear polycarbonate and a branched polycarbonate. Moreover, blends of any of the above materials may be employed in the practice of this invention to provide the aromatic polycarbonate. In any event, the preferred aromatic carbonate polymer for use as component (a)(i) herein is a homopolymer derived from 2,2-bis(4-hydroxylphenyl) propane (bisphenol-A).

The poly(ester-carbonate) copolymer resins (a)(ii) for use in the subject invention may generally be described as copolyesters comprising recurring carbonate groups,

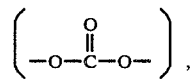

carboxylate groups,

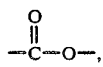

and aromatic carbocyclic groups in the linear polymer chain, in which at least some of the carboxylate groups and at least some of the carbonate groups are bonded directly to ring carbon atoms of the aromatic carbocyclic groups. These poly(ester-carbonate) copolymers, in general, are prepared by reacting a difunctional carboxylic acid, a dihydric phenol and a carbonate precursor.

The dihydric phenols useful in formulating the poly(ester-carbonates)for use as component (a)(ii) herein may be represented by the general formula:

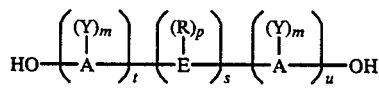

in which A is an aromatic group such as phenylene, biphenylene, naphthylene, anthrylene, etc. E may be an alkylene or alkylidene group such as methylene, ethylene, propylene, propylidene, isopropylidene, butylene, butylidene, isobutylidene, amylene, isoamylene, amylidene, isoamylidine, etc. Where E is an alkylene or alkylidene group, it may also consist of two or more alkylene or alkylidene groups, connected by a non-alkylene or non-alkylidene group such as an aromatic linkage, a tertiary amino linkage, an ether linkage, a carbonyl linkage, a silicon-containing linkage, or by a sulfur-containing linkage such as sulfide, sulfoxide, sulfone, etc. In addition, E may be a cycloaliphatic group (e.g. cyclopentyl, cyclohexyl), a cycloalkylidene such as cyclohexylidene, a sulfur containing linkage, such as sulfide, sulfoxide or sulfone; and ether linkage; a carbonyl group; a tertiary nitrogen group; or a silicon containing linkage such as silane or siloxy. Other groups which E may represent will occur to those skilled in the art. R is hydrogen or a monovalent hydrocarbon group such as alkyl (methyl, ethyl, propyl, etc.), aryl (phenyl, naphthyl, etc.), aralkyl (benzyl, ethylphenyl, etc.) or cycloaliphatic (cyclopentyl, cyclohexyl, etc.). Y may be an inorganic atom such as chlorine, bromine, fluorine, etc; an inorganic group such as the nitro group, etc; an organic group such a R above, or an oxy group such as OR, it being only necessary that Y be inert to and unaffected by the reactants and the reaction conditions. The letter m is any whole number from and including zero through the number of positions on A available for substitution; p is any whole number from and including zero through the number of available positions on E; t is a whole number equal to at least one, S is either zero or one, and u is any whole number including zero.

In the dihydric phenol compound represented by Formula II above, when more than one Y substituent is present, they may be the same or different. The same is true for the R substituent. Where s is zero in Formula II and u is not zero, the aromatic rings are directly joined with no intervening alkylene or other bridge. The positions of the hydroxyl groups and Y on the aromatic nuclear residues A can be varied in the ortho, meta, or para positions and the groupings can be in a vicinal, asymmetrical or symmetrical relationship, where two or more ring carbon atoms of the aromatic hydrocarbon residue are substituted with Y and hydroxyl group. Examples of dihydric phenol compounds that may be employed in this invention include
2,2-bis-(4-hydroxyphenyl)-propane (bisphenol-A);
2,4'-dihydroxydiphenylmethane;
bis-(2-hydroxyphenyl)-methane;
bis-(4-hydroxyphenyl)-methane;
bis-(4-hydroxy-5-nitrophenyl)-methane;
bis-(4-hydroxy-2,6-dimethyl-3-methoxyphenyl)-methane;
1,1-bis-(4-hydroxyphenyl)-ethane;
1,2-bis-(4-hydroxyphenyl)-ethane;
1,1(4-hydroxy-2-chlorophenyl)-ethane;
1,1-bis-(2,5-dimethyl-4-hydroxyphenyl)-ethane;
1,3-bis-(3-methyl-4-hydroxyphenyl)-propane;
2,2-bis-(3-phenyl-4-hydroxyphenyl)-propane;
2,2-bis-(3-isopropyl-4-hydroxyphenyl)-propane;
2,2-bis-(4-hydroxynaphthyl)-propane;
2,2-bis-(4-hydroxyphenyl)-pentane;
3,3-bis-(4-hydroxyphenyl)-pentane;
2,2-bis-(4-hydroxyphenyl)-heptane;
bis-(4-hydroxyphenyl)-phenylmethane;
bis-(4hydroxyphenyl)-cyclohexylmethane;
1,2-bis-(4-hydroxyphenyl)-1,2-bis-(phenyl)-propane;
2,2-bis-(4-hydroxyphenyl)-1-phenylpropane; and the like. Also included are dihydroxybenzenes typified by hydroquinone and resorcinol, dihydroxydiphenyls such as 4,4'-dihydroxydiphenyl; 2,2'-dihydroxydiphenyl; 2,4'-dihydroxydiphenyl; dihydroxy-naphthalenes such as 2,6-dihydroxynaphthalene, etc.

Also useful are dihydric phenols wherein E is a sulfur containing radical such as the dihydroxy aryl sulfones exemplified by: bis-(4-hydroxyphenyl) sulfone; 2,4'-dihydroxydiphenyl sulfone; 5-chloro-2,4'dihydroxydiphenyl sulfone; 3-chloro-bis-(4-hydroxyphenyl) sulfone; and 4,4'-dihydroxytriphenyldisulfone; etc. The preparation of these and other useful sulfones are described in U.S. Pat. No. 2,288,282. Polysulfones as well as substituted sulfones using halogen, nitrogen, alkyl radicals, etc. are also useful.

Dihydroxy aromatic ethers such as those described in U.S. Pat. No. 3,148,172 are useful as the dihydric phenol herein. The dihydroxy aromatic ethers may be prepared as described in U.S. Pat. No. 2,739,171. Illustrative of such compounds are the following:
4,4'-dihydroxydiphenyl ether;
4,4'-dihydroxytriphenyl ether;
the 4,3'-, 4,2'-, 4,1'-, 2,2'-, 2,3'-, etc. dihydroxydiphenyl ethers;
4,4'-dihydroxy-2,6-dimethyldiphenyl ether;
4,4'-dihydroxy-2,5-dimethyldiphenyl ether;
4,4'-dihydroxy-3,3'-diisobutyldiphenyl ether;
4,4'-dihydroxy-3,3'-diisopropyldiphenyl ether;
4,4'-dihydroxy-3,3'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,3'-dibromodiphenyl ether;
4,4'-dihydroxydinaphthyl ether;
4,4'-dihydroxy-3,3'-dichlorodinaphthyl ether;
2,4-dihydroxytetraphenyl ether;
4,4'-dihydroxypentaphenyl ether;
4,4'-dihydroxy-2,6-dimethoxydiphenyl ether;
4,4'-dihydroxy-2,5-diethoxy-diphenyl ether, etc.

Mixtures of the dihydric phenols can also be employed and where dihydric phenol is mentioned herein, mixtures of such materials are considered to be included.

In general, any difunctional carboxylic acid or its reactive derivative such as the acid halide conventionally used in the preparation of polyesters may be used for the preparation of polyester-carbonates useful in formulating the compositions of the present invention. In general, the carboxylic acids which may be used include the aliphatic carboxylic acids, aliphatic-aromatic carboxylic acids, or aromatic carboxylic acids. The aromatic dicarboxylic acids or their reactive derivatives such as the aromatic diacid halides are preferred as they produce the aromatic polyestercarbonates which are most useful, from the standpoint of physical properties, in the practice of the instant invention.

These carboxylic acids may be represented by the general formula:

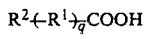

wherein $R^1$ represents an alkylene, alkylidene or cycloaliphatic group in the same manner as set out above for E in Formula II; an alkylene, alkylidene or cycloaliphatic group containing ethylenic unsaturation; an aromatic radical such as phenylene, naphthylene, bisphenylene, substituted phenylene, etc.; two or more aromatic groups connected through non-aromatic linkages such as those defined by E in Formula II; or a divalent aliphatic-aromatic hydrocarbon radical such as an aralkyl or alkaryl radical. $R^2$ is either a carboxyl or a hydroxyl group. The letter q represents the integer one where $R^2$ is a hydroxyl group and either zero or one where $R^2$ is a carboxyl group. Thus the difunctional carboxylic acid will either be a monohydroxy monocarboxylic acid or a dicarboxylic acid. For purposes of the present invention the aromatic dicarboxylic acids or their reactive derivatives such as, for example, the acid halides, are preferred. Thus in these preferred aromatic dicarboxylic acids, as represented by Formula III, $R^2$ is a carboxyl group and $R^1$ is an aromatic radical such as phenylene, biphenylene, napthylene, substituted phenylene, etc., two or more aromatic groups connected through non-aromatic linkages; or a divalent aliphatic-aromatic radical. Some nonlimiting examples of suitable preferred aromatic dicarboxylic acids which may be used in preparing the polyestercarbonate resins of the instant invention include phthalic acid, isophthalic acid, terephthalic acid, homophthalic acid, o-, m-, and p-phenylenediacetic acid, the polynuclear aromatic acids such as diphenic acid, and 1,4-naphthalic acid.

These acids may be used individually or as mixtures of two or more different acids.

The carbonate precursor may be either a carbonyl halide, a carbonate ester, or a haloformate. The carbonyl halides which can be employed herein are carbonyl chlorides and carbonyl bromide. Typical of the carbonate esters which may be employed herein are diphenyl carbonate, di(halophenyl) carbonates such as di(chlorophenyl) carbonate, di(bromophenyl)carbonate, di(trichlorophenyl)carbonate, di(tribromophenyl)carbonate, etc., di(alkylphenyl)carbonates such as di(tolyl) carbonate, etc., di(naphthyl)carbonate, di(-chloronaphthyl) carbonate, phenyltolyl carbonate, chloronaphthyl chlorophenyl carbonate, and the like. The haloformates suitable for use herein include bishaloformates of dihydric phenols such as bischloroformates of hydroquinone, etc. or glycols such as bis-haloformates of ethylene glycol, neopentyl glycol, polyethylene glycol, etc. While other carbonate precursors will occur to those skilled in the art, carbonyl chloride, also known as phosgene is preferred.

The preparation of polyester-carbonates which may be employed in the compositions of the present invention is described in U.S. Pat. Nos. 3,030,331; 3,169,121; 3,207,814; 4,194,038 and 4,156,069.

The polyestercarbonate which are useful in the practice of the present invention include the aromatic polyestercarbonates derived from dihydric phenols, aromatic dicarboxylic acids or their reactive derivatives such as the aromatic diacid halides, and phosgene. A quite useful class of aromatic polyester-carbonate is that derived from bisphenol A, isophthalic acid, terephthalic acid, or a mixture of isophthalic acid and terephthalic acid, or the reactive derivatives of these acids such as terephthaloyl dichloride, isophthaloyl dichloride, or a mixture of isophthaloyl dichloride and terephthaloyl dichloride, and phosgene. The molar proportion of dihydroxydiaryl units to benzenedicarboxylate units to carbonate units can range from 1:0.30–0.90:0.70–0.10 and the molar range of terephthalate units to isophthalate units can range from 9:1 to 0.3:9.7.

The subject invention also comprises as component (b) a polyester resin selected from the group consisting of (i) a poly(alkylene terephthalate) resin;

(ii) an amorphous copolyester copolymer resin, and (iii) mixtures of (i) and (ii).

The poly(alkylene terephthalate) resins for use as component (b)(i) herein are very well known and may be prepared by methods set forth in Whinfield, U.S. Pat. No.2,465,319 and Pengilly, U.S. Pat. No.3,047,539. The polyalkylene terephthalate resins for use herein will generally comprise a $C_1$–$C_{10}$ polyalkylene terephthalate. Poly(ethylene terephthalate) is generally preferred and may be utilized as virgin or scrap polymer. If desired, other polyalkylene terephthalate such as poly(1,4-butylene terephthalate) may be employed or mixtures of polyalkylene terephthalates.

The amorphous copolyester copolymer resin for use as component (b)(ii) herein is a polyester copolymer which can, without limitation, comprise the reaction product of a glycol portion comprising 1,4cyclohexanedimethanol and ethylene glycol wherein the molar ratio of the 1,4-cyclohexanedimethanol to ethylene glycol in the glycol portion is from about 4:1 to 1:4, with an acid portion comprising terephthalic acid, or isophthalic acid or mixtures of both acids.

The copolyester component (b)(ii) may be prepared by procedures well known to those skilled in this art, such as by condensation reactions substantially as shown and described in U.S. Pat. No.2,901,466. More particularly, the acid or mixture of acids or alkyl esters of the aromatic dicarboxylic acid or acids, for example dimethylterephthalate, together with the dihydric alcohols are charged to a flask and heated to temperatures sufficient to cause condensation of the copolymer to begin, for example 175°–225° C. Thereafter the temperature is raised to about 250° to 300° C., and a vacuum is applied and the condensation reaction is allowed to proceed until substantially complete.

The condensation reaction may be facilitated by the use of a catalyst, with the choice of catalyst being determined by the nature of the reactants. The various catalysts for use herein are very well known in the art and are too numerous to mention individually. Generally, however, when an alkyl ester of the dicarboxylic acid compound is employed, an ester interchange type of catalyst is preferred, such as NaH Ti(OC$_4$H$_9$)$_6$ in n-butanol. If a free acid is being reacted with the free glycols, a catalyst is generally not added until after the preliminary condensation has gotten under way.

The reaction is generally begun in the presence of an excess of glycols and initially involves heating to a temperature sufficient to cause a preliminary condensation followed by the evaporation of excess glycol. The entire reaction is conducted with agitation under an inert atmosphere. The temperature can then be advantageously increased with or without the immediate application of a vacuum. As the temperature is further increased, the pressure can be advantageously greatly reduced and the condensation allowed to proceed until the desired degree of polymerization is achieved. The product can be considered finished at this stage or it can be subjected to further polymerization in the solid phase in accordance with well-known techniques. Thus, the highly monomeric condensation product produced can be cooled, pulverized, and the powder heated to a temperature somewhat less than that employed during the last stage of the molten phase polymerization thereby avoiding coagulation of the solid particles. The solid phase polymerization is conducted until the desired degree of polymerization is achieved. The solid phase polymerization, among other things, results in a higher degree of polymerization without the accompanying degradation which frequently takes place when continuing the last stage of the melt polymerization at a temperature high enough to achieve the desired degree of polymerization. The solid phase process is advantageously conducted with agitation employing an inert atmosphere at either normal atmospheric pressure or under a greatly reduced pressure.

The copolyesters for use as component (b)(ii) in the subject invention generally will have an internal viscosity of at least about 0.4 dl./gm. as measured in 60/40 phenol/tetrachloroethane or other similar solvent at about 25° C. and will have a heat distortion temperature of from about 60° C. to 70° C. The relative amounts of the 1,4-cyclohexanedimethanol to ethylene glycol in the glycol portion may vary so long as the molar ratio of 1,4-cyclohexanedimethanol to ethylene glycol is from 1:4 to 4:1, in order to provide a polyester copolymer having suitable properties and a heat distortion temperature within the recited range.

A preferred copolyester for use as the amorphous polyester copolymer component (b)(ii) in the subject invention is a copolyester as described above wherein the glycol portion has a predominance of ethylene glycol over 1,4-cyclohexanedimethanol, for example greater than 50/50 and especially preferably is about 70 molar ethylene glycol to 30 molar 1,4cyclohexanedimethanol and the acid portion is terephthalatic acid. A preferred copolyester of this type is commercially available under the tradename KODAR PETG 6763 from Eastman Chemical Company.

The compositions of the subject invention further comprise an impact modifier combination comprising:
 (i) a multiphase composite interpolymer having a first elastomeric core stage of a $C_1$–$C_6$ alkyl acrylate together with a crosslinking monomer and a graftlinking monomer and a hard final stage of completely or preponderantly, a $C_1$–$C_6$ alkyl methacrylate; and
 (ii) a copolymer of an olefin and at least one of a $C_1$–$C_6$ alkyl acrylate, a $C_1$–$C_6$ alkyl methacrylate, acrylic acid, methacrylic acid, or a mixture of any of the foregoing.

Multiphase composite interpolymer component (c)(i) is an interpolymer comprising about 25 to 95 percent by weight of a first elastomeric phase and about 75 to 5 percent by weight of a final rigid thermoplastic phase. One or more intermediate phases are optional, for example, a middle stage polymerized from about 75 to 100 percent by weight styrene.

The first stage of multiphase composite interpolymer component (c)(i) is polymerized from about 75 to 99.8 weight percent $C_1$ to $C_6$ alkyl acrylate resulting in an acrylic rubber core having a $T_g$ below about 10° C. and crosslinked with 0.1 to 5 weight percent crosslinking monomer and further containing 0.1 to 5 percent by weight graftlinking monomer. The preferred alkyl acrylate is butyl acrylate. The crosslinking monomer is a polyethylenically unsaturated monomer having a plurality of addition polymerizable reactive groups all of which polymerize at substantially the same rate of reaction. Suitable crosslinking monomers include poly acrylic and poly methacrylic esters of polyols such as butylene diacrylate and dimethacrylate, trimethylol propane trimethacrylate, and the like, di-and trivinyl benzene, vinyl acrylate and methacrylate, and the like. The preferred crosslinking monomer is butylene diacrylate. The graftlinking monomer is a polyethylenically unsaturated monomer having a plurality of addition polymerizable reactive groups, at least one of which polymerizing at substantially different rate of polymerization from at least one other of said reactive groups. The function of the graftlinking monomer is to provide a residual level of unsaturation in the elastomeric phase, particularly in the latter stages of polymerization, and consequently, at or near the surface of the elastomer particles. When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to the surface of the elastomer. Among the effective graftlinking monomers are allyl group-containing monomers of allyl esters of ethylenically unsaturated acids such as allyl acrylate, allyl methacrylate, diallyl maleate, diallyl fumarate, diallyl itaconate, allyl acid maleate, allyl acid fumarate, and allyl acid itaconate. Somewhat less preferred are the diallylesters of polycarboxylic acids which do not contain polymerizable unsaturation. The preferred graftlinking monomers are allyl methacrylate and diallyl maleate. A most preferred interpolymer has only two stages, the first stage comprising about 60 to 95 percent by weight of the interpolymer and being polymerized from a monomer system comprising 95 to 99.8 percent by weight butyl acrylate, 0.1 to 2.5 percent by weight butylene diacrylate as cross-linking agent, 0.1 to 2.5 percent by weight allyl methacrylate or diallyl maleate as graftlinking agent with a final stage polymerized from about 60 to 100 percent by weight methyl methacrylate. A preferred two stage interpolymer of this type is commercially available under the tradename, ACRYLOID KM 330, from Rohm & Haas Chemical Company.

The final stage monomer system can be comprised of $C_1$ to $C_6$ methacrylate, styrene, acrylonitrile, alkyl acrylates, allyl methacrylate, diallyl methacrylate, and the like, as long as the overall $T_g$ is at least 20° C. Preferably the final stage monomer system is at least 50 weight percent $C_1$ to $C_4$ alkyl methacrylate. It is further preferred that the final stage polymer be free of units which tend to degrade poly(alkylene terephthalates), for example acid, hydroxyl,amino, and amide groups.

The multiphase composite interpolymers are prepared sequentially by emulsion polymerization techniques wherein each successive outer stage coats the previous stage polymer. By way of illustration, the monomeric $C_1$–$C_6$ acrylate, the cross-linking monomer and the graft-linking monomer are copolymerized in water in the presence of a free-radical generating catalyst and a polymerization regulator which serves as a chain transfer agent, at a temperature on the order of from 15° C. to 80° C. The first elastomeric phase is formed in situ to provide a latex of the core copolymer.

Thereafter, the second rigid thermoplastic phase monomers are added and are emulsion polymerized with the core-copolymer latex to form the interpolymers.

Any of the well known free radical generating catalysts which polymerize methyl methacrylate or acrylates per se may be utilized in the emulsion polymerization.

Suitable catalysts are, for example, those of the organic peroxide type, such as methyl ethyl ketone peroxide and benzoyl peroxide; those of the hydroperoxide type, such as cumene hydroperoxide; those of the persulfate type, such as potassium persulfate, or catalysts such as azoisobutyronitrile. Thus, the usual water-soluble as well as the monomer-soluble types of catalysts may be employed. Amounts of catalysts used are normally within the 0.05 to 0.5 parts by weight of the monomers used.

Polymerization regulators suitable for use in the process are those organic sulfur compounds such as thioacids, high molecular weight mercaptans such as benzyl mercaptan, aliphatic mercaptans having at least six carbon atoms per molecule such as octyl, dodecyl and tertiary dodecyl mercaptan, mixtures of mercaptans such as are obtained for example from lauryl alcohol, nitrohydrazine, amino compounds, carbon tetrachloride and similar well known polymerization modifiers or regulators. Alkyl mercaptans of low water solubility such as n-dodecyl mercaptans or tertiary dodecyl mercaptan are preferred. Amounts of modifier added to control the rate of polymerization may be within the range of about 0.2 to 5% by weight of the monomers used.

Coagulation of the interpolymerized product is then effected with a calcium chloride solution, for instance, whereupon it is filtered, washed and dried. The coagulated interpolymer may also be filtered through cheesecloth and spray dried at inlet/outlet temperatures of 150° C./50° C. to provide a free flowing powder.

These and other suitable composite interpolymers for use herein as component (c)(i) and their preparation are more fully described in U.S. Pat. Nos. 4,034,013 and 4,096,202, incorporated herein by reference.

Impact modifier combination (c) also comprises as component (c)(ii) a copolymer of an olefin and at least one monomeric compound selected from the group consisting of a $C_1$–$C_6$ alkyl acrylate, $C_1$–$C_6$ alkyl methacrylate, acrylic acid, methacrylic acid and a mixture of any of the foregoing.

Copolymer component (c)(ii) is made from an olefin, e.g., ethylene, propylene, or the like, copolymerized with one or more of a comonomer comprising a $C_1$–$C_6$ alkyl acrylate, e.g., methyl acrylate, ethyl acrylate, hexyl acrylate and the like; a $C_1$–$C_6$ alkyl methacrylate, e.g., methyl methacrylate, ethyl methacrylate, hexyl methacrylate, and the like; acrylic acid; or methacrylic acid. Especially preferred are the well known copolymers of ethylene with an alkyl ester of acrylic acid. These are disclosed in U.S. Pat. No. 2,953,551. Generally, the acrylate or methacrylate portion of the copolymer can range from about 10 to about 30 weight percent. The olefin portion of the copolymer can range from about 70 to about 90 weight percent. The preferred copolymer for use as component (b)(ii) is an ethylene-ethyl acrylate copolymer in which the weight ratio of the ethylene fraction to the ethyl acrylate fraction is about 4.5 to 1. Suitable olefin-acrylate copolymers, as defined above, can be prepared by methods well known to those skilled in the art or can be obtained commercially. For example, Union Carbide's BAKELITE®DPD-6169 ethylene-ethyl acrylate copolymer is suitable for use in the present invention.

Within the stated components and within the broad composition ranges specified above, many resin mixtures may be prepared in accordance with the subject invention which exhibit improved impact resistant behavior over an unmodified polycarbonate resin. Thus, for example, in one embodiment, the subject invention provides resin mixtures comprising an aromatic polycarbonate resin (a)(i), a poly(alkylene terephthalate) resin (b)(i), and impact modifier combination (c). In another embodiment, the subject invention comprises a resin mixture of an aromatic polycarbonate resin (a)(i), an amorphous copolyester copolymer resin (b)(ii), and impact modifier combination (c). In a further embodiment the subject invention provides an impact resistant resin mixture comprising an aromatic polycarbonate resin (a)(i), a poly(alkylene terephthalate) resin (b)(i), an amorphous copolyester copolymer resin (b)(ii), and impact modifier combination (c). In another embodiment the subject invention provides a resin mixture comprising a poly(ester-carbonate) copolymer resin (a)(ii), a poly(alkylene terephthalate) resin (b)(i), and impact modifier combination (c). In still another embodiment the subject invention provides a resin mixture comprising a poly(estercarbonate) copolymer resin (a)(ii), an amorphous copolyester copolymer resin (b)(ii) and impact modifier combination (c). In a further embodiment the subject invention provides a resin mixture comprising a poly(ester-carbonate) copolymer resin (a)(ii), a poly(alkylene terephthalate) resin (b)(i), an amorphous copolyester copolymer resin (b)(ii) and impact modifier combination (c). In another embodiment, the subject invention provides a resin mixture comprising an aromatic polycarbonate resin (a)(i), a poly(estercarbonate) copolymer resin (a)(ii), a poly(alkylene terephthalate) resin (b)(i), and impact modifier combination (c). In still another embodiment, an impact resistant resin mixture is provided comprising an aromatic polycarbonate resin (a)(i), a poly(estercarbonate) copolymer resin (a)(ii), an amorphous copolyester copolymer resin (b)(ii) and impact modifier combination (c). In a further embodiment the subject invention provides a resin mixture comprising an aromatic polycarbonate resin (a)(i), a poly(estercarbonate) copolymer resin (a)(ii), a poly(alkylene terephthalate) resin (b)(i), an amorphous copolyester copolymer resin (b)(ii), and impact modifier combination (c).

The compositions of the subject invention may be prepared by dry blending the aromatic carbonate polymer resin component (a), the polyester resin component (b) and impact modifier combination component (c) until complete dispersion of all of the ingredients is obtained. The resin mixtures are then extruded and chopped to form pellets and thereafter molded in accordance with conventional methods. The extrusion and molding cycles should preferably be carried out at temperatures of below about 525° F. to avoid any thermal degradation of the polymers and thereby obtain maximum impact strength enhancement for the resin mixtures of the invention.

The resistance to impact failure of the polycarbonate resin mixtures prepared in accordance with the subject invention was determined in accordance with the Notched Izod Impact Test, ASTM D256 on molded test specimens in the form of bars 2 ½"×½"×⅛", the latter dimension being the specimen thickness. The test specimens were mounted in accordance with ASTM D256 procedures and were tested at room temperature. Izod impact strengths were determined for all specimens according to ASTM D256 procedures on notched specimens.

DESCRIPTION OF THE PREFERRED EMBODIMENTS

In order that those skilled in the art may better understand how the present invention may be practiced, the following examples are given by way of illustration and not by way of limitation. All parts and percentages are by weight unless otherwise noted. The various polycarbonate resin mixtures were extruded in a Sterling extruder at 540° F. and molded in a 3 oz. Van Dorn injection molding machine at 500° C.

EXAMPLES 1-5

A Copolyestercarbonate copolymer, namely LEX-AN®3250, General Electric Company, is used in the examples. Although it is commercially available, a substantially identical poly(estercarbonate) copolymer resin for use herein may be prepared as follows:

To a reactor vessel is added 16 liters of methylene chloride, 8 liters of water, 1906 grams (8.36 moles) of bisphenol-A, 24 milliliters of triethylamine, 3.4 grams of sodium glyconate, and 65 grams of paratertiary-butylphenol chain terminator. At a pH of between about 9–10.5, 1089.6 grams (5.37 moles) of a mixture of 15% by weight of isophthaloyl dichloride and 85% by weight of terephthaloyl dichloride in 2 liters of methylene chloride is added over a 10 minute interval while controlling the pH at about 9–10.5 with 35% aqueous caustic. After the addition of the diacid chloride mixture, phosgene is added at a rate of 36 grams per minute for 12 minutes while controlling the pH at about 10–11 with 35% aqueous caustic. The polymer mixture is diluted with 2 liters of methylene chloride and the brine phase is separated. The resulting polymer phase is washed once with 0.1 HCl and three times with water and is then recovered by high steam precipitation to yield a white powder. This preferred poly(estercarbonate) copolymer has molar ratios of dihydroxy-diaryl units to benzene dicarboxylate units to carbonate units of about 1:0.6–0.75 : 0.4–0.25 and a molar ratio of terephthalate units to isophthalate units of about 8.5:1.5.

Resin mixtures were prepared and tested in accordance with Examples 1–5. The copolyestercarbonate was mixed with a polyester resin selected from a scrap grade poly(ethylene terephthalate) (Goodyear Company) or an amorphous copolyester copolymer resin in the form of a poly(0.7)-ethylene-co-(0.3)-1,4-cyclohexanedimethylene terephthalate) resin (Kodar PETG 6763, Eastman Chemical Company) or a mixture of the two polyesters. The components were mixed in a laboratory tumbler until well mixed. Thereafter an impact modifier combination comprising a multiphase composite interpolymer having a rubbery first stage comprising n-butyl acrylate with an allyl methacrylate graft linking monomer, and a butylene acrylate crosslinking monomer and a hard final stage comprising methyl methacrylate (ACRYLOID KM 330, Rohm & Haas Chemical Company) and an ethylene/ethyl acrylate copolymer (DPD-6169, Union Carbide Company) was added. The ingredients were then blended together by mechanically mixing them in a laboratory tumbler and the resulting mixture was fed to an extruder which was operated at about 540° F. The resulting extrudates were comminuted into pellets. The pellets were injection molded at about 500° F. into test specimens of about 2 ½"×½"×⅛". Where indicated, Izod impact strengths of these specimens and the temperature conditions at which they were tested were measured according to the notched Izod test, ASTM D256. The numerical superscripts indicate the percent of test specimens which were ductile and the superscript H indicates that the sample failed in a hinged mode, which is an improvement over brittle failure. The sample labeled with letters are bisphenol-A copolyestercarbonate containing no modifier or an incomplete modifier combination as indicated. The formulations used and the results obtained are set forth in TABLE 1.

TABLE 1

POLY(ESTER-CARBONATE) COPOLYMER RESIN MODIFIED WITH POLYESTER RESIN, MULTIPHASE COMPOSITE INTERPOLYMER RESIN AND OLEFIN - $C_1$-$C_6$ ALKYL ACRYLATE COPOLYMER RESIN

| | EXAMPLE | | | | | | | | | | |
|---|---|---|---|---|---|---|---|---|---|---|---|
| | A | B | C | D | E | F | 1 | 2 | 3 | 4 | 5 |
| COMPOSITION (pbw) | | | | | | | | | | | |
| Poly(ester-carbonate) copolymer[a] | 100 | 80 | 80 | 60 | 65 | 60 | 65 | 80 | 60 | 65 | 60 |
| Poly(ethylene terephthalate) resin[b] | — | 20 | — | — | 25 | 30 | 35 | — | — | 25 | 30 |
| Poly((0.7)-ethylene-co-(0.3)1,4-cyclohexane dimethylene terephthalate resin[c] | — | — | 20 | 40 | 10 | 10 | — | 20 | 40 | 10 | 10 |
| Multiphase composite interpolymer[d] | — | — | — | — | — | — | 3.2 | 3.2 | 3.2 | 3.2 | 3.2 |
| Ethylene/ethyl-acrylate copolymer[e] | — | — | — | — | — | — | 1.0 | 1.0 | 1.0 | 1.0 | 1.0 |
| PROPERTIES: | | | | | | | | | | | |
| DTUL, at 264 psi, °C. ROOM TEMP. | 163 | 140 | 129.0 | 106 | 99.2 | 99.7 | 111.0 | 126.6 | 109.3 | 106.4 | 104.8 |
| IMPACT STRENGTH | | | | | | | | | | | |
| ⅛" notched Izod, ft-lbs/in. | 6.0° | 5.6° | 8.67° | 2.76 | 2.0° | 1.53° | 9.95[100] | 10.0° | 12.77[100] | 14.53[100] | 16.27[100] |

[a] LEXAN® 3250, General Electric Company.
[b] scrap grade, Goodyear Company
[c] KODAR PETG 6763 Eastman Kodak Company.
[d] ACRYLOID KM 330, Rohm & Haas Chemical Company.
[e] DPD-6169, Union Carbide Company.

These data illustrate, that for compositions prepared in accordance with the subject invention wherein the aromatic carbonate polymer resin is a poly (estercarbonate) copolymer resin, unexpectedly improved impact strengths at room temperature are obtained as compared with the unmodified poly(estercarbonate) copolymer resin or partially modified resin.

Each of the above-mentioned patents, applications and publications are specifically incorporated herein by reference. Although the subject invention has been described with reference to certain preferred embodiments, many obvious modifications or changes may be made therein or will suggest themselves to those skilled in the art. For example, instead of a bisphenol-A polycarbonate, one containing units derived from tetramethylbisphenol-A or from dixylenol sulfone can be used as component (a)(i). Instead of a poly(ester-carbonate) based on terephthalate and isophthalate units, naphthenate units may be substituted for either. Instead of a multiphase composite interpolymer having an n-butyl acrylate core, one having an ethyl acrylate core could be used. Instead of an ethylene-ethyl acrylate copolymer, propylene may be substituted for olefin component or there can be used copolymers of ethylene and methyl methacrylate, ethylene and acrylic acid and ethylene and methacrylic acid, to name but a few of the variations possible. All such obvious modifications are within the scope and spirit of the subject invention as defined by the appended claims.

What is claimed is:

1. A resin mixture comprising:
   (a) an aromatic poly(ester-carbonate) copolymer resin, and
   (b) group consisting a mixture of
      (i) a poly(alkylene terephthalate) resin, and
      (ii) an amorphous copolyester copolymer resin, and
   (c) a minor amount of an impact modifier combination therefor comprising:
      (i) a multiphase composite interpolymer comprising a first elastomeric core phase of a $C_1$-$C_6$ alkyl acrylate together with a crosslinking monomer and a graft-linking monomer and a hard final stage comprising, completely or predominantly, a $C_1$-$C_6$ alkyl methacrylate; and
      (ii) a copolymer of an olefin and at least one comonomer selected from the group consisting of a $C_1$-$C_6$ alkyl acrylate, a $C_1$-$C_6$ alkyl methacrylate, acrylic acid, methacrylic acid, and a mixture of any of the foregoing, wherein component (a) comprises from about 55 to about 85 weight percent of (a) and (b) and component (c) comprises from about 3 to about 10 weight percent of (a) and (b).

2. A resin mixture as defined in claim 1 wherein said impact modifier combination (c) comprises from about 50 to 80 weight percent of (c)(i).

3. A resin mixture as defined in claim 1 wherein said poly(estercarbonate) resin is derived from (a) a dihydric phenol, (b) at least one aromatic dicarboxylic acid or a reactive derivative thereof, and (c) a carbonate precursor.

4. A resin mixture as defined in claim 1 wherein said poly(estercarbonate) resin is derived from bisphenol-A, terephthaloyldichloride, isophthaloyldichloride and phosgene, wherein the molar ratios of dihydroxy-diaryl units to benzene dicarboxylate units to carbonate units is from about 1:0.6-0.75 : 0.4-0.25 and the molar ratio of terephthalate units to isophthalate units is about 8.5:1.5.

5. A resin mixture as defined in claim 1 wherein said polyester resin component comprises a mixture of (i) a poly(alkylene terephthalate) resin and (ii) an amorphous copolyester copolymer resin comprising a polyester copolymer derived from
   (a) a glycol portion comprising 1,4-cyclohexanedimethanol and ethylene glycol, wherein the molar ratio of 1,4- cyclohexanedimethanol to ethylene glycol is from about 1:4 to 4:1 and
   (b) an acid portion comprising an aromatic dicarboxylic acid selected from the group consisting of terephthalic acid, isophthalic acid and a mixture of the two acids.

6. A resin mixture as defined in claim 1 wherein said polyester resin component (b) comprises, a mixture of (i) a poly(ethylene terephthalate) resin and (ii) a poly((0.7)ethylene-co-(0.3) 1,4-cyclohexanedimethylene terephthalate) resin.

* * * * *